United States Patent
Audenaert et al.

(10) Patent No.: US 6,440,321 B1
(45) Date of Patent: Aug. 27, 2002

(54) MIXED FLUOROCHEMICAL HYDROCARBON CONDENSATES TO IMPART OIL AND WATER REPELLENCY TO A SUBSTRATE

(75) Inventors: Frans A. Audenaert, Kaprijke; Dirk M. Coppens, Melsele; Rudolf J. Dams, Antwerp, all of (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/381,572

(22) PCT Filed: Apr. 8, 1997

(86) PCT No.: PCT/EP97/01744

§ 371 (c)(1),
(2), (4) Date: Sep. 17, 1999

(87) PCT Pub. No.: WO98/45345

PCT Pub. Date: Oct. 15, 1998

(51) Int. Cl.$^7$ .................... C08G 12/40; D06M 13/432; D06M 15/437
(52) U.S. Cl. .................... 252/8.57; 252/8.61; 252/8.62; 427/389; 427/389.9; 428/473; 526/242; 526/248; 528/396; 528/401
(58) Field of Search ................ 252/8.57, 8.61, 252/8.62; 427/389, 389.9; 428/473; 526/242, 248; 528/396, 401

(56) References Cited

U.S. PATENT DOCUMENTS

| | | | |
|---|---|---|---|
| 3,362,782 A | 1/1968 | Gagliardi | 8/189 |
| 3,480,579 A | 11/1969 | Raynolds | 524/238 |
| 3,506,661 A | 4/1970 | Enders et al. | 544/196 |
| 3,510,455 A | 5/1970 | Olson | 528/244 |
| 4,014,857 A | 3/1977 | Schmoyer | 528/402 |
| 5,292,796 A | 3/1994 | Dams et al. | 524/598 |

FOREIGN PATENT DOCUMENTS

DE     3133303 A1    3/1983

Primary Examiner—Anthony Green
(74) Attorney, Agent, or Firm—Robert H. Jordan

(57) ABSTRACT

A fluorochemical composition to impart water repellency and/or oil repellency to a substrate, the composition comprising one or more condensates of (i) a methylolated amine or a $C_1$–$C_4$ alkoxylated derivative thereof, (ii) a hydrocarbon compound represented by formula (II) and (iii) a fluorinated compound represented by formula (I):

$$R_f-(X^1)_n-Z^1 \qquad (I)$$

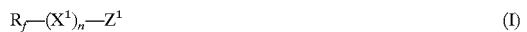

wherein:

$R_f$ is a fluorinated aliphatic group; $X^1$ is an organic divalent linking group; $Z^1$ is selected from the group consisting of hydroxy, thiol, amide or acid groups; and n is 0 or 1; and $$R_h-Z^2 \qquad (II)$$

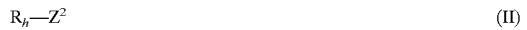

wherein:

$R_h$ is a hydrocarbon group having at least 6 carbon atoms and optionally being substituted with 1 to 3 subsituents; $Z^2$ is selected from the group consisting of hydroxy, thiol, amide or acid groups. The invention further provides a method of treatment of a substrate with the fluorochemical composition and a treated substrate.

20 Claims, No Drawings

MIXED FLUOROCHEMICAL HYDROCARBON CONDENSATES TO IMPART OIL AND WATER REPELLENCY TO A SUBSTRATE

1. FIELD OF THE INVENTION

The present invention relates to a fluorochemical composition to impart water and/or oil repellency to a substrate, in particular to a fibrous material such as textile or leather. In particular, the present invention relates to fluorochemical compositions that are based on fluoroaliphatic and hydrocarbon radical containing condensates of an amino resin. The present invention also relates to a method of making these condensates and to a method of treatment of a substrate therewith.

2. BACKGROUND OF THE INVENTION

Organofluorine compounds (i.e., fluorochemicals) are substances containing portions that are fluorocarbon in nature (e.g., hydrophobic, oleophobic, and chemically inert) and portions that are organic or hydrocarbon in nature (e.g., chemically reactive in organic reactions). Some fluorochemicals are familiar to the general public, such as SCOTCHGARD™ carpet protector, which imparts oil and water repellency and stain and soil resistance to carpet. Other such substances have various industrial uses, such as reducing the surface tension of liquids, reducing evaporation and inflammability of volatile organic liquids, and improving the leveling of organic polymer coatings.

The utility of organofluorine compounds as surface-active agents (i.e., surfactants) and surface-treating agents is due in large part to the extremely low free-surface energy of a $C_6$–$C_{12}$ fluorocarbon group, according to H. C. Fielding, "Organofluorine Compounds and Their Applications," R. E. Banks, Ed., Society of Chemical industry at p. 214 (1979). Generally, the organofluorine substances described above are those which have carbon-bonded fluorine in the form of a monovalent fluoroaliphatic radical such as a perfluoroalkyl group, typically $C_nF_{2n+1}$, where n is at least 3, the terminal part of which group is trifluoromethyl, —$CF_3$.

Fluorochemical based water and/or oil repellent compositions for treating substrates, in particular textiles and leather are of substantial commercial importance. Amongst water and/or oil repellent compositions known in the art to treat substrates are those based on amino resins and in particular condensates of formaldehyde and melamine. For example, an aqueous emulsion of fluorochemical containing melamines (FC-melamine) is commercially used as an oil and water repellent. However, due to the poor solubility of the FC-melamines in common organic solvents, it is generally required to first dissolve the FC-melamine in a fluorinated solvent or a chlorofluorinated solvent and then disperse that solution in water in the presence of an emulsifier using high energy emulsifying equipment. The solvent can subsequently be recovered via distillation. Such procedure is cumbersome, expensive and moreover requires the use of environmentally unacceptable solvents.

DE 3133303 describes FC-melamines that are obtained by condensation of highly etherified hexamethylolmelamine and a perfluorinated thiol. These compounds can be used in the form of an aqueous emulsion to treat textiles and leather in order to provide water and oil repellency thereto. While good results can be obtained on textiles, the results of such FC-melamines on leather leaves a desire for further improvement. Moreover, as set out above, these compounds are generally only soluble in fluorinated solvents.

U.S. Pat. No. 3,510,455 teaches the production of thermosettable fluorinated prepolymers by reacting an aldehyde, a nitrogen compound, e.g. urea or melamine, and a fluorinated aliphatic compound which contains a perfluorinated alkyl chain as well as at least one functional group with an active hydrogen atom. These prepolymers are soluble in usual solvents and cure on polar surfaces to continuous, adherent films. The prepolymers prepared according to this patent are not believed to be suitable for the treatment of textile materials.

U.S. Pat. No. 3,362,782 teaches the application of condensation products of optionally etherified methylolated compounds of heterocyclic nitrogen compounds with 1,1-dihydroperfluoroalkyl alcohols or perfluorocarboxylic acid amides, e.g. with perfluoroheptyloxymethylpenta-(methoxymethyl)-melamine for the anti-soiling finishing of cellulose textile material. For the application an organic solvent is used. However, the oil-and water-repellent effects achieved with these condensation products do not meet the present requirements. Moreover, unproportionally large quantities of these condensation products have to be used.

Fatty acid derivatives of melamine are disclosed in U.S. Pat. No. 3,506,661 to treat textiles and in particular for water repellent impregnation. These melamine derivatives are said to be soluble in chlorated hydrocarbons, in aromatic hydrocarbons such as benzene, benzol and toluol. However, these compounds are unsuitable as oil repellents and also do not provide the presently desired water repellency on textiles.

U.S. Pat. No. 3,480,579 discloses the use of condensates of hexaalkyloxymethyl melamines and long chain aliphatic acids in a composition to impart water repellency to a textile. According to this disclosure, the composition preferably also contains a fluorinated oil and water repellent compound in particular a polymeric, fluorine containing aliphatic compound.

U.S. Pat. No. 5,292,796 discloses fluorochemical compositions comprising fluorinated compounds, wherein the fluorinated compound comprises a fluorochemical oligomeric portion bonded through —O—, —S—, —NH— or $CO_2$— to a moiety comprising a group derived from an amino resin. Particularly disclosed amino resins include methylolated melamines, benzoguanamines and acetylguanamines and methylated derivatives thereof The compositions can be used to impart durable abrasion-resistant oil and water repellent properties. Further, according to the teaching of this patent, the amino resin may contain a long chain aliphatic group, and, if desired to increase the hydrophobic character of a substrate to be treated, it is possible to include compounds such as fatty acid condensates with melamine or urea derivatives. According to the examples in this patent, the fluorochemical is dissolved in hexafluoroxylene and the resultant solution is emulsified in water with the aid of a surfactant.

3. SUMMARY OF THE INVENTION

The present invention provides a fluorochemical composition that is readily soluble in non-fluorinated organic solvents and that can provide good and/or improved water and/or oil repellency on substrates, particularly textile or leather substrates.

The fluorochemical composition comprises one or more condensates of (i) a methylolated amide or an alkoxylated derivative thereof, (ii) a hydrocarbon compound selected from an alcohol, a thiol, an amide or an acid having a hydrocarbon group of at least 6 carbon atoms and which hydrocarbon group is optionally substituted with up to 3 substituents and (iii) a fluorinated compound corresponding to formula (I):

$$R_f—(X^1)_n—Z^1 \quad (I)$$

wherein:
R_f represents a fluorinated aliphatic group;
X_1 represents an organic divalent linking group;
Z_1 represents hydroxy, thiol, an amide group or an acid group and n is 0 or 1.

The present invention also provides the use of the fluorochemical composition to impart water repellency and/or oil repellency to a substrate.

The present invention further provides a method of treatment of a substrate with the fluorochemical composition and substrates comprising the fluorochemical composition on their surface.

Also provided is a method of making the fluorochemical composition.

4. DETAILED DESCRIPTION OF THE PRESENT INVENTION

The fluorochemical composition can be prepared by reacting, in the presence of an acid catalyst, (i) a methylolated amine or an alkoxylated derivative thereof, (ii) a hydrocarbon compound selected from an alcohol, a thiol, an amide or an acid having a hydrocarbon group with at least 6 carbon atoms and which hydrocarbon group is optionally substituted with up to 3 substituents and (iii) a fluorinated compound corresponding to formula (I):

$$R_f—(X^1)_n—Z^1 \quad (I)$$

wherein:
R_f represents a fluorinated aliphatic group;
X$^1$ represents an organic divalent linking group;
Z$^1$ represents hydroxy, thiol, an amide or an acid group, such as e.g. a carboxylic acid, and n is 0 or 1.

The methylolated amines or alkoxylated derivatives thereof can be selected from the group consisting of methylolated melamines, methylolated urea, methylolated benzoguanamine, methylolated acetoguanamine or an alkoxylated derivative thereof Examples include hexamethoxymethyl melamine, trimethoxymethyl melamine, dimethoxymethyl urea, dimethoxymethyl ethyleneurea, dimethoxymethyl propyleneurea.

The alkoxylated derivatives of methylolated amines are most preferred in the present invention since they have a better stability in an acidic medium and the formation of substantial amounts of cross-linked materials during the preparation of the condensates in accordance with this invention can be avoided. Particularly preferred are $C_1$–$C_4$ alkoxylated derivatives and more preferably $C_1$–$C_2$ derivatives. The alkoxylated derivatives of methylolated amines are preferably highly etherified, i.e. preferably at least 70% and more preferably at least 90% of the alcohol groups are etherified. A highly, preferred alkoxylated derivative of a methylolated amine comprises hexamethylol melamine ether, the methylol groups of which are etherified with an alcohol containing 1 to 4, especially 1 to 2 carbon atoms. Commercially available hexamethoxymethyl melamines useful in this invention include CYMEL™ 300, CYMEL™ 301, CYMEL™ 303 and CYMEL™ 350, differing from each other in the amount of free methylol groups.

Blends of methylolated amines and/or alkoxylated derivatives thereof can also be used to prepare the fluorochemical composition.

Preferred hydrocarbon compounds for use in the preparation the fluorochemical composition can be represented by formula II $$R_h—(X^2)_m—Z^2 \quad II$$

wherein:
R_h represents a hydrocarbon group
X$^2$ represents a divalent organic linking group
Z$^2$ represents hydroxy, thiol or an acid group, such as e.g. a carboxylic acid, and m is 0 or 1.

The term "hydrocarbon group" in connection with the present invention is used to indicate not only groups consisting of hydrogen and carbon but also groups that can optionally be substituted by a functional group such as e.g. halogen, hydroxy, amino etc.

R_h includes hydrocarbon groups having at least 6 carbon atoms and more preferably at least 8 carbon atoms. These hydrocarbon groups can optionally contain 1 to 3 substituents which are preferably selected from the group consisting of chlorine, bromine, fluorine, hydroxy, amino groups, alkoxycarbonyl groups, alkoxy groups etc. More preferably however, the hydrocarbon group is unsubstituted and preferably saturated. Particularly preferred R_h-groups included unsubstituted linear or branched alkyl groups. Preferably such alkyl groups have at least 8 carbon atoms. R_h-groups may also contain cycloaliphatic groups such as cyclohexyl groups or cyclohexylene groups. In accordance with the present invention it is also possible to use a mixture of hydrocarbon compounds in the condensation reaction to make the fluorochemical composition thus yielding condensates having different hydrocarbon radicals. A preferred mixture includes a hydrocarbon compound wherein R_h is a linear alkyl group, and a hydrocarbon compound wherein R_h is a branched alkyl group.

Suitable R_f-groups for the fluorinated compounds according to formula (I) are fluorinated, stable, inert, preferably saturated, non-polar, monovalent aliphatic radicals. They can be straight chain, branched chain, cyclic or combinations thereof They can contain heteroatoms, bonded only to carbon atoms, such as oxygen, divalent or hexavalent sulfur, or nitrogen. R_f is preferably a fully-fluorinated radical, but hydrogen or chlorine atoms can be present as substituents if not more than one atom of either is present for every two carbon atoms. The R_f group has at least 3 carbon atoms, preferably 3 to 14 carbon atoms, and preferably contains about 40% to about 80% fluorine by weight, more preferably about 50% to about 78% fluorine by weight. The terminal portion of the R_f group is a perfluorinated moiety, which will preferably contain at least 7 fluorine atoms, e.g., $CF_3CF_2CF_2$—, $(CF_3)_2CF$—, $F_5SCF_2$—. The preferred R_f groups are fully or substantially fluorinated and are preferably those perfluorinated aliphatic radicals of the formula $C_tF_{2t+1}$— where t is 3 to 14.

Linking groups X$^1$ and X$^2$ in the above formulas (I) and (II) preferably contain from 1 to about 20 carbon atoms. Optionally they can contain oxygen, nitrogen or sulfur-containing groups or a combination thereof Preferably the linking groups are selected from the group consisting of straight chain, branched chain or cyclic alkylene, arylene, aralkylene, sulfonyl, poly(alkyleneoxy), urethanylene, ureylene, carbonamidoalkylene or sulfonaridoalkylene groups. Representative X$^1$ groups are described in the following list. For the purposes of this list, each k is independently an integer from 1 to about 20, g is an integer from 0 to about 10, h is an integer from 1 to about 20, R' is hydrogen, phenyl, or alkyl group of 1 to about 4 carbon atoms, and $R_2$' is an alkyl group of 1 to about 20 carbon atoms.

—$SO_2NR'(CH_2)_k$—
—$CONR'(CH_2)_k$—

—$(CH_2)_k$—
—$CH_2CH(OH)CH_2$—
—$CH_2CH(OR'_2)CH_2$—
—$CH=CH_2(CH_2)_k$—
—$(CH_2)_kO(CH_2)_k$—
—$(CH_2)_kS(CH_2)_k$—
—$(CH_2)_k(OCH_2CH_2)_k$—

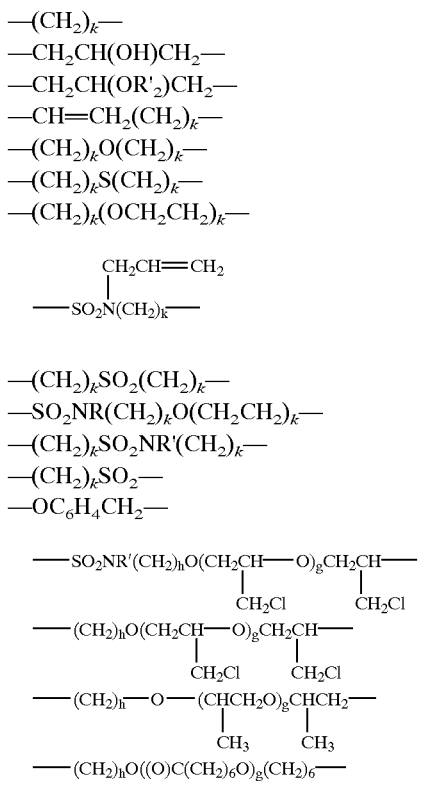

—$(CH_2)_kSO_2(CH_2)_k$—
—$SO_2NR(CH_2)_kO(CH_2CH_2)_k$—
—$(CH_2)_kSO_2NR'(CH_2)_k$—
—$(CH_2)_kSO_2$—
—$OC_6H_4CH_2$—

Preferred $X^1$ groups include —$(CH_2CH_2)_k$— and —$SO_2N(R)CH_2CH_2$— wherein k is 1 or 2 and R is a $C_1$–$C_4$-alkyl group. If $R_f$ is a perfluorinated radical, a linking group ($X^1$) is generally required.

The relative mole ratio of the fluorinated compound and the hydrocarbon compound to the methylolated amine or an alkoxylated derivative thereof in the reaction mixture can vary. Any residual alkoxy groups on the condensates of the invention can be used for crosslinking with the reactive groups, such as hydroxy or amino groups on the substrates during drying and curing step of the application. It will further be appreciated by one skilled in the art that the method of preparation of the fluorochemical composition may result in a mixture of condensates containing varying amounts of fluorochemical groups and hydrocarbon groups. Such mixture can be used in accordance with this invention without separating the various condensates.

Any acid catalyst known to be useful in condensation reactions can be used in the above described method. Typically a strong acid catalyst such as p-toluene sulfonic acid, camphene sulfonic acid, amberlyst IR-120 and methane sulfonic acid are preferred.

According to a preferred mode of carrying out the condensation, the methylolated amine or alkoxylated derivative thereof, the fluorinated compound and hydrocarbon compound are mixed and heated until a homogeneous mixtures is obtained. Subsequently, the catalyst can be added. Preferably, the reaction is carried out without addition of a solvent although it may be desirable to add high boiling solvents to lower the viscosity. The term "high boiling" in connection with this embodiment means a solvent that has a boiling point well above the boiling point of the alcohol (generally methanol) formed during condensation.

During the reaction, a volatile alcohol is formed that can be removed by distillation to shift the equilibrium towards the formation of the condensates. To accomplish this, it is preferred to carry out the condensation at a temperature at least 20° C. above the boiling point of the alcohol formed during condensation. In this particular embodiment, the condensation is carried out in two steps by (1) reacting the reaction mixture of catalyst and components (i), (ii) and (iii) at a temperature that is at least 20° C. or more above the boiling point of the volatile alcohol formed until little or no volatile alcohol distills off the reaction mixture; and then (2) increasing the temperature of the reaction mixture by about 40 to 80° C., preferably by about 40 or 50° C. for an additional period which is typically one or two hours.

It is also desirable to maintain a flow of an inert gas, such as nitrogen gas, above the reaction surface of the reaction mixture to avoid foaming and to speed up the reaction.

The fluorochemical composition is soluble in various non-fluorinated organic solvents such as acetates (ethyl acetate), ethers (di-propylene glycol mono methyl ether, tetrahydrofuran, ethylene glycol ethers), ketones (acetone, methyl ethyl ketone, methyl isobutyl ketone), alcohols (methanol, ethanol, isopropylalcohol, glycols), dimethylpyrrolidone and mixtures of thereof. Accordingly, the fluorochemical composition can be used as a solution in such organic solvents or alternatively, a emulsion in water of the fluorochemical composition can be prepared according to well-known techniques. For example, a solution of the fluorochemical composition in an organic solvent, e.g. ethylacetate, gradually can be added to a solution of an emulsifier in water with vigorous stirring. The thus obtained pre-mix may then be subjected to ultrasound treatment or high shear homogenization to obtain a milky emulsion of the fluorochemical composition in water. If desired, the organic solvent can then be removed e.g. by distillation under reduced pressure.

The fluorochemical composition of this invention can be applied using conventional application methods and can be used as an aqueous emulsion. Alternatively it can be used as a treatment composition in solvent. An aqueous emulsion will generally contain water, an amount of fluorochemical composition effective to provide repellent properties to a substrate treated therewith, and a surfactant in an amount effective to stabilize the emulsion. Water is preferably present in an amount of about 70 to about 20000 parts by weight based on 100 parts by weight of the fluorochemical composition of the invention.

The surfactant is preferably present in an amount of about 1 to about 25 parts by weight, preferably about 5 to about 10 parts by weight, based on 100 parts by weight of the fluorochemical composition. Conventional cationic, nonionic, anionic, and zwitterionic surfactants are suitable.

The amount of the treating composition applied to a substrate in accordance with this invention is chosen so that sufficiently high or desirable water and oil repellencies are imparted to the substrate surface, said amount usually being such that 0.01% to 5% by weight, preferably 0.05% to 2% by weight, based on the weight of the substrate, of fluorochemical composition is present on the treated substrate. The amount which is sufficient to impart desired repellency can be determined empirically and can be increased as necessary or desired.

Various additives may be incorporated into the fluorochemical compositions of the invention to impart special properties to the treated substrate, for example, hydrocarbon extenders can be added for soil resistance; also fat liquors or synthetic tanning agents can be added.

If it is desired to improve the softness or "hand" of a substrate treated with a composition of the invention, it is possible to use fluorine-free softeners, such as certain polyethylenes, polydimethylsiloxanes, modified hydrogenalkylpolysiloxanes, or other materials known to those skilled in the art.

It is also possible to use a composition of the invention in combination with other fluorinated products or with polymers or auxiliary products such as polyglycols, colloids such as starch, dextrin, casein, sizing agents, fixing or retaining agents, materials to improve stain resistance, cleaning ability, fire proofing or antistatic properties, buffering agents, fungicidal agents, optical bleaching agents, sequestering agents, mineral salts, surface-active agents, or swelling agents to promote penetration. Particular suitable auxiliary products and amounts thereof can be easily selected by those skilled in the art.

The substrates treated by the water and oil repellency imparting composition of this invention are not especially limited and include fibrous materials such as textile fabrics, fibers, non-wovens, leather, paper, carpet, plastic, wood, metal, glass. The fluorochemical composition is particularly useful for imparting water- and oil repellency to leather. These properties can be imparted by a drum treatment during the tanning process of the leather. The leather substrate is then typically dried for about 24 hours at room temperature and subsequently cured for about 5 to 10 minutes at 60 to 70° C.

In order to affect treatment of a textile substrate, the substrate can be immersed in a diluted emulsion. The saturated substrate can then be run through a padder/roller to remove excess emulsion, dried and cured in an oven at a temperature and for a time sufficient to provide a cured treated substrate. This curing process is typically carried out at temperatures between about 110° C. and about 190° C. depending on the particular system or application method used. In general, a temperature of about 150° C. to 170° C. for a period of about 20 seconds to 10 minutes, preferably 3 to 5 minutes, is suitable. The cured treated substrate can be used as desired, e.g. incorporated or fashioned into a garment.

The invention is further illustrated by reference to the following examples without however the intention to limit the invention thereto.

EXAMPLES

Formulation and Treatment Procedure

Treatment baths were formulated containing a defined amount of the fluorochemical composition. Substrates used for the evaluation of the treatments of the invention are all commercially available and are listed below:

PES/CO: Grey polyester/cotton 65/35, style no 2681.2, obtained through Utexbel N.V., Ghent, Belgium PA: Polyamide microfiber, style No 7819, obtained from Sofinal, Belgium Leather: Reutlingen leather, available from Reutlingen, Germany Respective data of water and oil repellency shown in the Examples and Comparative Examples are based on the following methods of measurement and evaluation criteria:

Spray Rating (SR)

The spray rating of a treated substrate is a value indicative of the dynamic repellency of the treated substrate to water that impinges on the treated substrate. The repellency was measured by Standard Test Number 22, published in the 1985 Technical Manual and Yearbook of the American Association of Textile Chemists and Colorists (AATCC), and is expressed in terms of 'spray rating' of the tested substrate. The spray rating is obtained by spraying 250 ml water on the substrate from a distance of 15 cm. The wetting pattern is visually rated: using a 0 to 100 scale, where 0 means complete wetting and 100 means no wetting at all.

Water Repellency (WR)

The water repellency (WR) of a treated substrate was measured using a water-isopropyl alcohol test liquid, and is expressed in terms of the "WR" rating of the treated substrate. Treated substrates which were penetrated by or resistant only to a 100% water—0% isopropyl alcohol liquid (the least penetrating of the test liquids), were given a rating of 0, whereas treated substrates resistant to a 0% water—100% isopropyl alcohol test liquids (the most penetrating of the test mixtures) were given a rating of 10. Other intermediate values were determined by use of another water-isopropyl alcohol test liquid, in which the percentage amounts of water and isopropyl alcohol were each multiples of 10. The WR rating corresponds to the most penetrating test liquid which does not penetrate or wet the substrate after 15 seconds contact. In general, a water repellency rating of 2 or greater is desirable.

Oil Repellency (OR)

The oil repellency of a treated substrate was measured by the American Association of Textile Chemists and Colorists (AATCC) Standard Test Method No. 118–1983, which test is based on the resistance of a treated substrate to penetration by oils of varying surface tensions. Treated substrates resistant only to Nujol®, mineral oil (the least penetrating of the test oils) was given a rating of 1, whereas treated substrates resistant to heptane (the most penetrating of the test oils) was given a rating of 8. Other intermediate values were determined by use of other pure oils or mixtures of oils, as shown in the following table.

Standard Test Liquids

| AATCC Oil Repellency Rating Number | Compositions |
| --- | --- |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Laundering Procedure

The procedure set forth below was used to prepare treated substrate samples designated in the examples below as "5 Launderings (5L)".

A 230 g sample of generally square, 400 $cm^2$ to about 900 $cm^2$ sheets of treated substrate was placed in a washing machine along with a ballast sample (1.9 kg of 8 oz fabric in the form of generally square, hemmed 8100 $cm^2$ sheets). Conventional detergent ("Tide®", 46 g) was added and the washer was filled to high water level with hot water (40° C.+−3° C.). The substrate and ballast load was washed five times (no drying in between the cycles) using a 12-minute normal wash cycle followed by five rinse cycles and centrifuging. The dry substrate was pressed using a hand iron set at the temperature recommended for the particular substrate fabric.

Abbreviations

The following abbreviations and trade names are used in the examples:

HMMM: hexamethoxymethyl melamine, available from Dyno Cyanamid

MeFOSE: $C_8F_{17}SO_2N(CH_3)CH_2CH_2OH$

EtFOSE: $C_8F_{17}SO_2N(CH_2CH_3)CH_2CH_2OH$

Guerbitol-18: 2-alkylalkanol, known as Guerbet alcohol, average chain length C-18; available from Henkel, Duisseldorf, Germany Prisorine™ 3515: methyl branched isostearylalcohol; available from Unichema Chemie, Gouda, The Netherlands Ethoquad™ 18/25: Methyl polyoxyethylene(15) octadecyl ammonium chloride, available from Akzo, Littleborough, UK Ethoquad™ HT-25: Methyl polyoxyethylene(15) hydrogenated tallow ammonium chloride, available from Akzo, Littleborough, UK Marlowet™ 5401: polyethoxylated amine salt, available from Huils, Marl, Germany Kotylene™: polyoxyethylene (20) sorbitan monooleate Siponate™ DS-10: sodium dodecyl benzene sulfonate All parts, ratios, percentages, etc. in the following examples and the rest of the specification, are by weight unless otherwise noted.

A. Synthesis of Fluorochemical Composition

Several fluorochemical compositions as given in Table 1 have been prepared according to the general procedure as described for the synthesis of HMMM/EtFOSE/stearylalcohol 1/3/3.

A 1 liter, 3-necked reaction flask, equipped with a mechanical stirrer, a thermometer, a nitrogen inlet, a Dean Stark condenser and a heating mantle, was charged with 0.167 moles HMMM, 0.5 moles EtFOSE and 0.5 moles stearylalcohol. The mixture was stirred and heated to 80° C. until the solution became clear. Then 0.72 g p-toluene sulfonic acid catalyst was added. The reaction was gradually heated to 90° C., while a firm nitrogen flow was maintained. Methanol was distilled off in the Dean Stark condenser. The reaction was run for 3 hrs at 90° C. after which the mixture was gradually heated to 140° C. After 3 hours at 140° C., the final reaction product was obtained as a viscous paste. The reaction mixture was cooled to 100° C. after which 319 g ethylacetate was added via a dropping funnel, resulting in a 60% melamine solution in ethylacetate.

Examples FC-1 to FC-15 and Comparative Examples C-FC-1 to C-FC-5

B Emulsification of the Fluorochemical Composition

The fluorochemical compositions prepared above were emulsified using different emulsifiers or mixtures of emulsifiers, following the general procedure as described for the Marlowe™ 5401 emulsifier.

33.3 g ethylacetate was added to 66.7 g of the fluorochemical amine condensate (40% solids) obtained above. This solution was heated to 65° C. and then gradually added to an aqueous solution of 126 g deionized water and 2 g Marlowet™ 5401 emulsifier, whilst stirring vigorously on a magnetic stirring plate. The so formed pre-emulsion was then emulsified by immersion of an ultrasound probe (Branson™ 250 Sonifier) for 3 minutes at maximum output. The ethylacetate was distilled off with a rotary evaporator at 55° C., using waterjet vacuum. A stable milky white emulsion of about 20% solids was obtained. The emulsion thus formed was used to treat substrates.

Following the above described method, different fluorochemical compositions (FC-1 to FC-15 as given in Table 1) were synthesized. Comparative condensates (C-FC-1 to C-FC-5) were prepared essentially according to the same procedure, except for the emulsification. These comparative examples could not be emulsified out of ethylacetate due to poor solubility. They could be emulsified out of trifluorotoluene or hexafluoroxylene.

TABLE 1

Composition of Condensates

| Ex No | Fluorochemical Composition | Molar Ratio | % Fluorine |
|---|---|---|---|
| FC-1 | HMMM/EtFOSE/Stearylalcohol | 1/3/3 | 26.8 |
| FC-2 | HMMM/EtFOSE/Prisorine 3515 | 1/3/3 | 34.9 |
| FC-3 | HMMM/EtFOSE/2-ethylhexanol | 1/3/3 | 26.4 |
| FC-4 | HMMM/EtFOSE/Prisorine 3515 | 1/4/2 | 42.1 |
| FC-5 | HMMM/EtFOSE/Stearylalcohol | 1/4/2 | 35.5 |
| FC-6 | HMMM/MeFOSE/Stearylalcohol | 1/2/2 | 25.6 |
| FC-7 | HMMM/MeFOSE/Prisorine 3515 | 1/2/2 | 33.1 |
| FC-8 | HMMM/MeFOSE/2-ethylhexanol | 1/2/2 | 25.3 |
| FC-9 | HMMM/MeFOSE/Stearylalcohol | 1/2/4 | 18.1 |
| FC-10 | HMMM/MeFOSE/2-ethylhexanol | 1/3/3 | 26.8 |
| FC-11 | HMMM/MeFOSE/Stearylalcohol | 1/3/3 | 31.8 |
| FC-12 | HMMM/MeFOSE/2-ethylhexanol | 1/4/2 | 35.8 |
| PC-13 | HMMM/MeFOSE/Prisorine 3515 | 1/4/2 | 42.9 |
| FC-14 | HMMM/MeFOSE/Guerbitol-18 | 1/2/2 | |
| FC-15 | HMMM/MeFOSE/Prisorine 3515 | 1/3/3 | |
| C-FC-1 | HMMM/EtFOSE | 1/2 | 43.3 |
| C-FC-2 | HMMM/EtFOSE | 1/3 | 47.6 |
| C-FC-3 | HMMM/EtFOSE | 1/4 | 50.1 |
| C-FC-4 | HMMM/MeFOSE | 1/2 | 44.2 |
| C-FC-5 | HMMM/MeFOSE | 1/3 | 48.7 |

The solubility of the fluorochemical composition was evaluated in commonly used organic solvents and compared to the solubility of the HMMM/fluorinated compound condensates. 25 g of the fluorochemical composition and comparative compositions was mixed with 25 g ethylacetate (EtOAc) or methylisobutylketone (MIBK). The resultant mixture was stirred for 5 hours at a temperature of 65° C. The mixture was then cooled and allowed to stand for 24 hours at ambient temperature, after which the concentration of the organic phase was measured (recorded as % solids). The results are given in table 2.

Examples 1 to 9 and Comparative Examples C1 to C4

TABLE 2

Solubility of fluorochemical compositions in organic solvents

| Ex. no. | FC | % solids in EtOAc | % solids in MIBK |
|---|---|---|---|
| 1 | FC-1 | 14 | 15 |
| 2 | FC-3 | 50 | 50 |
| 3 | FC-4 | 45 | 46 |
| 4 | FC-6 | 44 | 45 |
| 5 | FC-7 | 43 | 43 |
| 6 | FC-10 | 45 | 46 |
| 7 | FC-11 | 9 | 9 |
| 8 | FC-14 | 50 | 50 |
| 9 | FC-15 | 35 | 34 |
| C1 | C-FC-2 | <10 | <10 |
| C2 | C-FC-3 | <5 | <5 |
| C3 | C-FC-4 | 18 | 17 |
| C4 | C-FC-5 | 9 | 9 |

The data shows that fluorochemical compositions are much more soluble than the HMMM/fluorinated compound condensates. In general, the condensates prepared with branched hydrocarbon alcohols such as 2-ethylhexanol, isostearylalcohol or Guerbet-type alcohols gave the best solubility in commonly used organic solvents.

Examples 10 to 33 and Comparative Examples C-5 to C-12

In examples 10 to 33 and comparative examples C-5 to C-12 fluorochemical compositions according to the invention and HMMM/fluorinated compound condensates were prepared according to the general procedure. They were emulsified using a mixture of nonionic/anionic emulsifiers (Kotylene™/Siponate™ DS10) according to the general procedure outlined above. The emulsions were applied in a drum treatment to Reutlingen leather at 1.8% SOF (Solids On Fiber). The treated leather was cured for 24 hrs at ambient temperature and during 5 minutes at 60° C. The performance results of the treated leather (both the suede and grain side of the leather) are given in Tables 3 and 4.

TABLE 3

Performance results of leather (suede) treated with condensates

| Ex. No. | Treatment Agent | OR | WR | SR | AOR | AWR |
|---|---|---|---|---|---|---|
| 10 | FC-2 | 2 | 7 | 70 | 2 | 9 |
| 11 | FC-3 | 5 | 8 | 80 | 5 | 9 |
| 12 | FC-4 | 1 | 3 | 80 | 1 | 3 |
| 13 | FC-5 | 5 | 10 | 80 | 6 | 10 |
| 14 | FC-6 | 7 | 10 | 80 | 7 | 9 |
| 15 | FC-7 | 7 | 9 | 80 | 7 | 10 |
| 16 | FC-8 | 7 | 9 | 80 | 7 | 10 |
| 17 | FC-9 | 6 | 9 | 80 | 5 | 8 |
| 18 | FC-10 | 7 | 9 | 80 | 7 | 10 |
| 19 | FC-11 | 5 | 8 | 80 | 6 | 8 |
| 20 | FC-12 | 6 | 9 | 80 | 6 | 8 |
| 21 | FC-13 | 7 | 9 | 70 | 6 | 9 |
| C-5 | C-FC-1 | 5 | 3 | 70 | 4 | 5 |
| C-6 | C-FC-2 | 5 | 8 | 80 | 5 | 8 |
| C-7 | C-FC-3 | 5 | 8 | 80 | 5 | 8 |
| C-8 | C-FC-5 | 1 | 2 | 70 | 1 | 2 |

TABLE 4

Performance of grain leather treated with fluorochemical treating agents

| Ex No. | Treatment Agent | OR | WR | SR | AOR | AWR |
|---|---|---|---|---|---|---|
| 22 | FC-2 | 0 | 2 | 70 | 0 | 2 |
| 23 | FC-3 | 0 | 2 | 70 | 0 | 2 |
| 24 | FC-4 | 1 | 2 | 70 | 0 | 2 |
| 25 | FC-5 | 1 | 3 | 70 | 0 | 3 |
| 26 | FC-6 | 1 | 3 | 80 | 1 | 3 |
| 27 | FC-7 | 1 | 2 | 80 | 1 | 3 |
| 28 | FC-8 | 2 | 2 | 80 | 1 | 3 |
| 29 | FC-9 | 0 | 2 | 70 | 0 | 2 |
| 30 | FC-10 | 2 | 2 | 80 | 2 | 3 |
| 31 | FC-11 | 2 | 2 | 89 | 1 | 2 |
| 32 | FC-12 | 2 | 3 | 80 | 2 | 2 |
| 33 | FC-13 | 1 | 3 | 70 | 0 | 3 |
| C-9 | C-FC-1 | 0 | 2 | 70 | 0 | I |
| C-10 | C-FC-2 | 1 | 2 | 70 | 0 | 1 |
| C-11 | C-FC-3 | 1 | 2 | 80 | 0 | 1 |
| C-12 | C-FC-5 | 0 | 2 | 50 | 0 | 0 |

The data shows that leather treated with fluorochemical compositions according to the invention generally performed better than leather treated with HMMM/fluorinated compound condensates.

Examples 34 to 46 and Comparative Examples C-13 to C-12

In examples 34 to 46 and comparative examples C-13 to C-17, fluorochemical compositions and HMMM/fluorinated compound condensates were prepared according to the general procedure outlined above. For these experiments the fluorochemical compositions and HMM/fluorinated compound condensates were emulsified with a cationic emulsifier system (Ethoquad™ HT-25) according to the general procedure outlined above. The emulsions were applied to polyester/cotton substrate by padding at a concentration of 0.3% SOF. The treated substrates were cured at 150° C. during 3 min. The performance results of the treated substrates are given in Table 5.

TABLE 5

Performance results of PES/CO treated with condensates

| | FC amine | Initial performance | | 5 Launderings | |
|---|---|---|---|---|---|
| Ex No | condensate | OR | SR | OR | SR |
| 34 | FC-1 | 2 | 90 | 1 | 50 |
| 35 | FC-2 | 2 | 70 | 1 | 50 |
| 36 | FC-3 | 2 | 70 | 1 | 50 |
| 37 | FC-4 | 4 | 70 | 1 | 50 |
| 38 | FC-5 | 2 | 90 | 2 | 70 |
| 39 | FC-6 | 2 | 100 | 2 | 70 |
| 40 | FC-7 | 6 | 80 | 3 | 50 |
| 41 | FC-8 | 5 | 90 | 3 | 70 |
| 42 | FC-9 | 1 | 100 | 1 | 70 |
| 43 | FC-10 | 5 | 90 | 4 | 70 |
| 45 | FC-12 | 5 | 100 | 4 | 70 |
| 46 | FC-13 | 4 | 90 | 2 | 70 |
| C-13 | C-FC-1 | 3 | 80 | 2 | 70 |
| C-14 | C-FC-2 | 5 | 90 | 4 | 70 |
| C-15 | C-FC-3 | 3 | 90 | 2 | 70 |
| C-16 | C-FC-4 | 3 | 80 | 1 | 50 |
| C-17 | C-FC-5 | 3 | 80 | 3 | 70 |

The data shows that although the fluorochemical compositions have a lower fluorine content compared to the condensates that contain only fluorochemical radical, similar performance can be obtained by substrates treated therewith. The data also shows a tendency that the use hydrocarbon compounds with straight hydrocarbon alkyl chains (such as stearylalcohol) improves the spray rating, whereas the use of hydrocarbon compounds with branched long chain hydrocarbon alkyl alcohols improves the overall oil repellency.

Examples 47 to 59 and Comparative Examples C-18 to C-22

In examples 47 to 59, and comparative examples C-18 to C-22 a similar evaluation to that in Examples 34 to 46 and comparative examples C-13 to C-17 was performed except that a polyamide substrate was used. The results of repellency are given in Table 6.

TABLE 6

Performance results of PA treated with condensates

| | FC amine | Initial performance | | 5 Launderings | |
|---|---|---|---|---|---|
| Ex No | condensate | OR | SR | OR | SR |
| 47 | FC-1 | 2 | 80 | 2 | 70 |
| 48 | FC-2 | 1 | 50 | 0 | 50 |

TABLE 6-continued

Performance results of PA treated with condensates

| Ex No | FC amine condensate | Initial performance OR | SR | 5 Launderings OR | SR |
|---|---|---|---|---|---|
| 49 | FC-3 | 2 | 70 | 0 | 50 |
| 50 | FC-4 | 2 | 70 | 1 | 50 |
| 51 | FC-5 | 2 | 80 | 1 | 70 |
| 52 | FC-6 | 3 | 100 | 1 | 70 |
| 53 | FC-7 | 6 | 80 | 3 | 70 |
| 54 | FC-8 | 5 | 80 | 3 | 70 |
| 55 | FC-9 | 2 | 100 | 1 | 80 |
| 56 | FC-10 | 4 | 80 | 3 | 70 |
| 57 | FC-11 | 2 | 100 | 1 | 80 |
| 58 | FC-12 | 5 | 80 | 4 | 70 |
| 59 | FC-13 | 4 | 80 | 1 | 70 |
| C-18 | C-FC-1 | 3 | 80 | 2 | 70 |
| C-19 | C-FC-2 | 5 | 80 | 3 | 70 |
| C-20 | C-FC-3 | 3 | 80 | 2 | 80 |
| C-21 | C-FC-4 | 2 | 90 | 1 | 80 |
| C-22 | C-FC-5 | 4 | 100 | 2 | 80 |

We claim:
1. Method of treatment of a substrate comprising contacting said substrate with a fluorochemical composition comprising one or more condensates of (i) a methylolated amine or a $C_1$–$C_4$ alkoxylated derivative thereof, (ii) a hydrocarbon compound represented by formula (II) and (iii) a fluorinated compound represented by formula (I):

$$R_f\text{—}(X^1)_n\text{—}Z^1 \tag{I}$$

wherein:
$R_f$ is a fluorinated aliphatic group;
$X^1$ is an organic divalent linking group;
$Z^1$ is selected from the group consisting of hydroxy, thiol amide and acid group;
and n is 0 or 1;

$$R_h\text{—}Z^2 \tag{II}$$

wherein:
$R_h$ is a hydrocarbon group having at least 6 carbon atoms and optionally being substituted with 1 to 3 substituents;
$Z^2$ is selected from the group consisting of hydroxy, thiol, amide and acid group.

2. Method according to claim 1 wherein said methylolated amine or a $C_1$–$C_4$ alkoxylated derivative thereof is selected from the group consisting of methylolated melamine, methylolated urea, methylolated benzoguanamine, methylolated acetylguanamine and an alkoxylated derivative thereof.

3. Method according to claim 2 wherein said methylolated melamine or a $C_1$–$C_4$ alkoxylated derivative thereof is hexamethylol melamine or a methoxylated derivative thereof.

4. Method according to claim 1 wherein said substrate is a fibrous material.

5. Method according to claim 1 wherein said substrate is textile or leather.

6. A method according to claim 1 wherein said substrate is textile or leather.

7. A method according to claim 1 wherein said fluorochemical composition is in the form of an aqueous emulsion.

8. A fluorochemical composition comprising one or more condensates of (i) a methylolated amine or a $C_1$–$C_4$ alkoxylated derivative thereof (ii) a hydrocarbon compound represented by formula (II) and (III) a fluorinated compound represented by formula (I):

$$R_f\text{—}(X^1)_n\text{—}Z^1 \tag{I}$$

wherein:
$R_f$ is a fluorinated aliphatic group;
$X^1$ is an organic divalent linking group;
$Z^1$ is selected from the group consisting of hydroxy, thiol, amide and acid group; and n is 0 or 1;

$$R_h\text{—}Z^2 \tag{II}$$

wherein:
$R_h$ is a hydrocarbon group having at least 6 carbon atoms and optionally being substituted with 1 to 3 substituents;
$Z^2$ is selected from the group consisting of hydroxy, thiol, amide and acid group.

9. A fluorochemical composition according to claim 8 wherein $R_h$ represents an alkyl group.

10. A fluorochemical composition according to claim 8 wherein said methylolated amine or a $C_1$–$C_4$ alkoxylated derivative thereof is selected from methylolated melamine, methylolated urea, methylolated benzoguanamine, methylolated acetylguanamine and an alkoxylated derivative of these.

11. A fluorochemical composition according to claim 10 wherein said methylolated melamine or a $C_1$–$C_4$ alkoxylated derivative thereof is hexamethylol melamine or a methoxylated derivative thereof.

12. A fluorochemical composition according to claim 8 dissolved in a non-fluorinated organic solvent.

13. A fluorochemical composition according to claim 8 in the form of an aqueous emulsion.

14. A method for preparing an aqueous emulsion of a fluorochemical composition as defined in claim 8 comprising dissolving said fluorochemical composition in a non-fluorinated organic solvent and subsequently dispersing a thus obtained solution in water with the aid of an emulsifier.

15. A method according to claim 14 wherein said non-fluorinated organic solvent is selected from the group consisting of ethylacetate and methylisobutylketone.

16. A substrate having on a surface a fluorochemical composition as defined in claim 8.

17. A substrate according to claim 16 wherein said substrate is a fibrous material.

18. A substrate according to claim 17 wherein said substrate is textile or leather.

19. Method of making a fluorochemical composition comprising reacting in the presence of an acid catalyst (i) a methylolated amine or a $C_1$–$C_4$ alkoxylated derivative thereof, (ii) a hydrocarbon compound represented by formula (II) and (iii) a fluorinated compound represented by formula (I):

$$R_f\text{—}(X^1)_n\text{—}Z^1 \tag{I}$$

wherein:
$R_f$ is a fluorinated aliphatic group;
$X^1$ is an organic divalent linking group;
$Z^1$ is selected from the group consisting of hydroxy, thiol, amide and acid group; and n is 0 or 1;

$$R_h\text{—}Z^2 \tag{II}$$

wherein:

$R_h$ is a hydrocarbon group having at least 6 carbon atoms and optionally being substituted with 1 to 3 substituents;

$Z^2$ is selected from the group consisting of hydroxy, thiol amide and acid group.

20. A method according to claim 19 wherein said methylolated amine or a $C_1$–$C_4$ alkoxylated derivative thereof is hexamethylol melamine or a methoxylated derivative thereof.

* * * * *

UNITED STATES PATENT AND TRADEMARK OFFICE
CERTIFICATE OF CORRECTION

PATENT NO. : 6,440,321 B1
DATED : August 27, 2002
INVENTOR(S) : Audenaert, Frans A.

It is certified that error appears in the above-identified patent and that said Letters Patent is hereby corrected as shown below:

Title page,
Item [57], ABSTRACT,
Line 22, "subsituents;" should read -- substituents; --

Column 2,
Line 42, "thereof The" should read -- thereof. The --

Column 3,
Line 40, "thereof Examples" should read -- thereof. Examples --
Lines 65-66, "preparation the fluorochemical" should read -- preparation of the fluorochemical --

Column 4,
Line 18, "alkoxy groups etc." should read -- alkoxy groups, etc. --
Line 54, "thereof Preferably" should read -- thereof. Preferably --

Column 6,
Line 22, "mixtures of thereof." should read -- mixtures thereof. --
Line 24, "a emulsion" should read -- an emulsion --

Column 9,
Line 5, "Guerbitol-18:" should read -- Guerbitol$^{TM}$-18: --
Line 8, "Duisseldorf" should read -- Düsseldorf --
Line 20, "Huils," should read -- Hüls --

Column 11,
Line 56, under "Table 4", "Ex No. 31", under column "SR", "89" should read -- 80 --

Column 12,
Line 8, "HMM/fluorinated" should read -- HMMM/fluorinated --
Line 32, under "Table 5", between "Ex Nos 43 and 45", the following row should be added: -- 44    FC-11    2    100    1    70 --

Column 14,
Line 1, "thereof (ii)" should read -- thereof, (ii) --
Line 2, "(II) and (III)" should read -- (II), and (iii) --

UNITED STATES PATENT AND TRADEMARK OFFICE
CERTIFICATE OF CORRECTION

PATENT NO. : 6,440,321 B1
DATED : August 27, 2002
INVENTOR(S) : Audenaert, Frans A.

It is certified that error appears in the above-identified patent and that said Letters Patent is hereby corrected as shown below:

Column 15,
Line 2, the following should be added after "wherein:",
-- $R_f$ is a fluorinated aliphatic group;
$X^1$ is an organic divalent linking group;
$Z^1$ is selected from the group consisting of hydroxy, thiol, amide and acid group;
and n is 0 or 1;

$$R_h \text{———} Z^2 \qquad (II)$$

wherein: --

Signed and Sealed this

Twenty-sixth Day of August, 2003

JAMES E. ROGAN
*Director of the United States Patent and Trademark Office*